LOGARITHMICALLY SWEEPING PULSE OSCILLATOR

Filed May 16, 1958 2 Sheets-Sheet 1

INVENTOR
Gordon E. Nelson
BY
Eldon H. Luther
ATTORNEY

April 18, 1961 G. E. NELSON 2,980,867
LOGARITHMICALLY SWEEPING PULSE OSCILLATOR
Filed May 16, 1958 2 Sheets-Sheet 2

INVENTOR
Gordon E. Nelson
BY
Eldon H. Luther
ATTORNEY

United States Patent Office 2,980,867

Patented Apr. 18, 1961

2,980,867

LOGARITHMICALLY SWEEPING PULSE OSCILLATOR

Gordon E. Nelson, Windsor, Conn., assignor to Combustion Engineering, Inc., New York, N.Y., a corporation of Delaware Filed May 16, 1958, Ser. No. 735,718

2 Claims. (Cl. 331—152)

This invention relates generally to oscillators and particularly to an oscillator wherein the frequency may be varied exponentially with time.

The oscillator, in accordance with the invention, produces electrical pulses, the repetition rate of frequency of which varies logarithmically with time and whose rate of logarithmic sweep can be controlled and used as a calibrating standard. The invention utilizes the Miller integrator or feed back operation whereby a linear descending ramp plate voltage is developed so that the period of the ramp, and accordingly in a circuit having sustained free oscillation the frequency of oscillation, will be varied in accordance with the variation of the starting or control voltage on the plate. Thus with an exponentially varying control voltage an exponential variation of frequency will be had. In a preferred embodiment, sustained oscillation is produced by cross coupling two phantastron circuits or their equivalents so that they trigger each other, as for example, in the manner shown on page 199 of "Wave Forms" vol. 19 by Chance et al. The period oscillation is controlled by an exponentially decaying direct current control potential which is started upon closing a switch. This decaying potential is applied to the plates of the phantastrons through a plate catching diode-cathode follower combination so that the potential on these plates is not allowed to rise above this control potential but may freely fall therebelow. Therefore, the successive negative ramps that appear at the plates of the phantastrons will be started at the control potential at which the plate is caught with this potential generally equaling that appearing at the cathode of the plate catching diode. At the completion of each ramp the plate potential flies back to the control voltage. Since the control potential is decaying exponentially the plate is caught or restarted at successive points along this decaying potential with this having the effect of exponentially decreasing the period of successive ramps at each phantastron which in turn results in an exponentially increasing frequency of oscillation.

The positive pulses appearing at the respective screens of the phantastron circuits are combined in a mixer so that a continuous pulse train is produced with this pulse train being the input signal for a univibrator and differentiator circuit which is effective to simultaneously produce positive and negative pulses with the output of the univibrator and differentiator being controlled both as to amplitude and polarity.

It is an object of this invention to provide an improved sweep oscillator the frequency of which may be varied logarithmically.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein.

Figures 1, 3, 4:
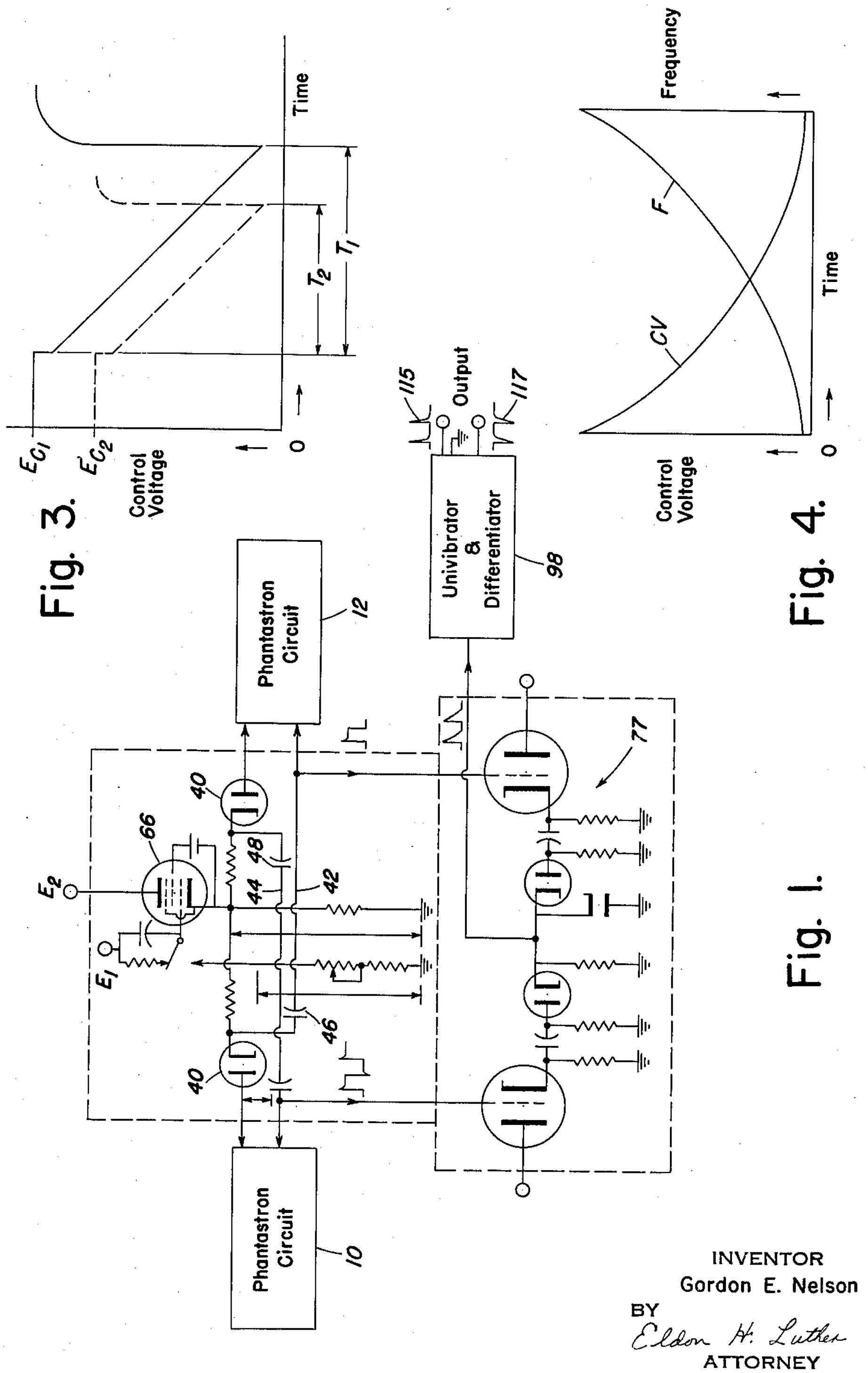
Fig. 1 is a schematic diagrammatic representation of a preferred form of the invention with the phantastron circuits and univibrator and differentiator circuit being represented in block form.
Fig. 3 is a curve showing the negative ramp at two different control voltages.
Fig. 4 are superimposed curves of control voltage and frequency drawn with a time abscissa and showing an exponential rise in frequency with time that results from an exponential decay in control voltage with time.

Referring now to the drawings the illustrative and preferred embodiment shown therein includes a pair of phantastron circuits 10 and 12 that are cross coupled for sustained oscillation. Each of the phantastron circuits includes a pentode 14 which has control grid 16 connected with plate 18 through capacitor 20 and cathode follower 22. With no gate applied suppressor 24 is biased to cut off, grid 16 is substantially at the potential of the cathode and substantially all the current is flowing to screen 28. A trigger pulse is applied to suppressor grid 24 through capacitor 26 which is connected between the suppressor grid and screen grid 28, and through this capacitor and the resistors 30, 32 and 34, the latter acting as voltage dividers, this pulse acts on suppressor grid 24 as a gate to gate the tube open. Upon being thus gated, a Miller integrator or Miller feed back action is initiated with a linear descending ramp voltage appearing on the plate 18 of the phantastron tube. This ramp descends to a predetermined voltage and then flies back to the original plate voltage or the voltage at which the plate is clamped or controlled. The Miller integrator or feed back action results from capacitor 20 being interconnected between the control grid 16 and plate 18 with the leak off from this capacitor through resistors 36 and 34 resulting in producing the ramp descent voltage on plate 18 and with variable resistors 34 being effective to regulate the slope of this ramp. The Miller action is set out on pages 195, et seq., of the aforementioned "Wave Forms."

Cathode follower 22 has its plate connected to a positive voltage E2 which is, for practical reasons, somewhat higher than E1, and has its cathode connected with a negative voltage E3. The purpose of this cathode follower and its connection is to provide a more rapid fly back at the end of the ramp than would be had if capacitor 20 would be connected directly to plate 18 with the time constant for recharging capacitor 20 or fly back being the RC constant of resistor 38 and capacitor 20.

The Miller integrator or feed back action produces a linear descending ramp voltage which may be utilized for precise time functions and with the phantastron circuit it is only necessary to trigger the circuit into operator for production of this ramp with the circuit having the inherent characteristic to act as though a gate were applied and with the descending ramp voltage flying back immediately upon bottoming.

The starting or maximum voltage on the plates 18 of the two phantastron circuits is controlled by plate catching diodes 40 and the two phantastrons are cross coupled by connecting the cathode of plate catching diode 40 for circuit 10 with the suppressor grid 24 and screen grid 28 of the pentode of the phantastron circuit 12 through conductor 42 and capacitors 46 and 26 and by similarly connecting the cathode of the plate catching diode 40 for circuit 12 with the suppressor and screen grid for the pentode of circuit 10 with this connection being through conductor 44 and capacitors 48 and 26. By means of this cross coupling connection, upon the fly back of one of the phantastron circuits so that the voltage on plate 18 increases to the point where the plate catching diode for that plate conducts a positive pulse is interposed on the suppressor and screen grid of the tube of the other phantastron circuit to trigger this circuit into operation. Therefore the cross coupling of the phantastrons 10 and 12 is effective to produce a continuous and sustained oscillation.

The period of oscillation is controlled by an exponentially decaying direct current potential which is applied to the plates 18 of the phantastron circuits through the plate catching diodes 40. This control is produced by the RC circuit 50 which includes resistors 52 and 54 and capacitor 56. Switch 58 is provided to connect capacitor 56 across positive voltage E1 and ground through resistors 52 and 54 or to connect both plates of the capacitor to the E1 voltage through resistor 60. Upon moving switch 58 into engagement with contact 62 the voltage across the capacitor 56 will be zero. Thus upon moving switch 58 into engagement with contact 64 capacitor 56 will become charged to the E1 to ground voltage with this charging of the capacitor taking place through resistors 52 and 54 and with an exponentially decaying voltage appearing on the grid 72 of the cathode follower as a result of this RC circuit. This negative decaying voltage also appears at cathode 69 of cathode follower 66 and is applied to the plates 18 of the tubes of the pantastron circuits through the plate catching diodes 40. The cathode follower 66 has its plate 68 connected with the positive E2 voltage and its cathode 69 connected to ground resistor 70. Grid 72 is connected with the negative plate of capacitor 56 and since the voltage of cathode 69 follows that of grid 72 this voltage will decay exponentially with that or the RC circuit 50.

Cathode 69 of the cathode follower 66 is connected with the cathodes of the plate catching diodes 40 whereby the voltage on the cathodes of these diodes varies with that of cathode 69. Since the plate catching diodes 40 are effective to prevent the maximum voltage on the plates 18 of the phantastron circuits, from rising above the control voltage with this maximum voltage being generally that of the cathodes of these plate catching diodes, the voltage on plates 18 will vary in accordance with the decaying voltage of the RC circuit.

This voltage to which plates 18 are caught is the starting voltage for the negative ramp produced on these plates upon triggering of the respective phantastron circuits and when a ramp is completed the plate voltage will fly back to this control voltage as determined by the RC circuit. Since the controlling voltage is decaying exponentially the plates of the phantastron circuits are caught and restarted at successive points along this decaying potential.

The effect of this is to vary the period of successive ramps in an exponential manner with this resulting because the ramp is linear. This will be clear upon considering Fig. 3 wherein the solid line ramp results from triggering one of the phantastron circuits when the plate catching voltage was at $Ec1$, with the period of this ramp descent being identified as T1. The dotted line ramp represents that obtained with a starting voltage or control voltage of $Ec2$ and with the period for this ramp being represented by T2. The period T1 and T2 are proportional to the control or plate catching voltage $Ec1$ and $Ec2$ or $$\frac{Ec1}{Ec2}=\frac{T1}{T2}$$

Therefore the period of each ramp varies directly with the clamping voltage or control voltage and with an exponentially decaying voltage the period will decrease exponentially. Since the frequency is the inverse of the period the exponentially decaying signal is inverted thus becoming an exponentially rising frequency and the rate of logarithmic sweep or rate of exponential frequency rise $$\left(f_1=f_0e\frac{t}{T}\right)$$

is determined by the RC constant of circuit 50

$$\left(E=E_0e\frac{-t}{RC}\right)$$

which is the control signal that is generated at the input to the cathode follower by charging capacitor 56 through resistor 52 and 54 across which an exponentially decaying voltage will appear. Resistor 54 is variable in order that the rate of exponential decay may be varied. Figure 4 shows that as the control voltage decreases logarithmically with time the frequency increases logarithmically with time.

The cathode follower 66 is used in order that the RC circuit 50 will not be loaded by the plate of the oscillators since if this cathode follower was not employed resistor 72' will be in parallel with this RC circuit and tend to load it causing a significant voltage differential between plate circuit 18 and resistors 52 and 54 and will tend to provide a non-linear drain path resulting in a deviation in the control voltage from a true exponentially decaying potential.

Figure 2:
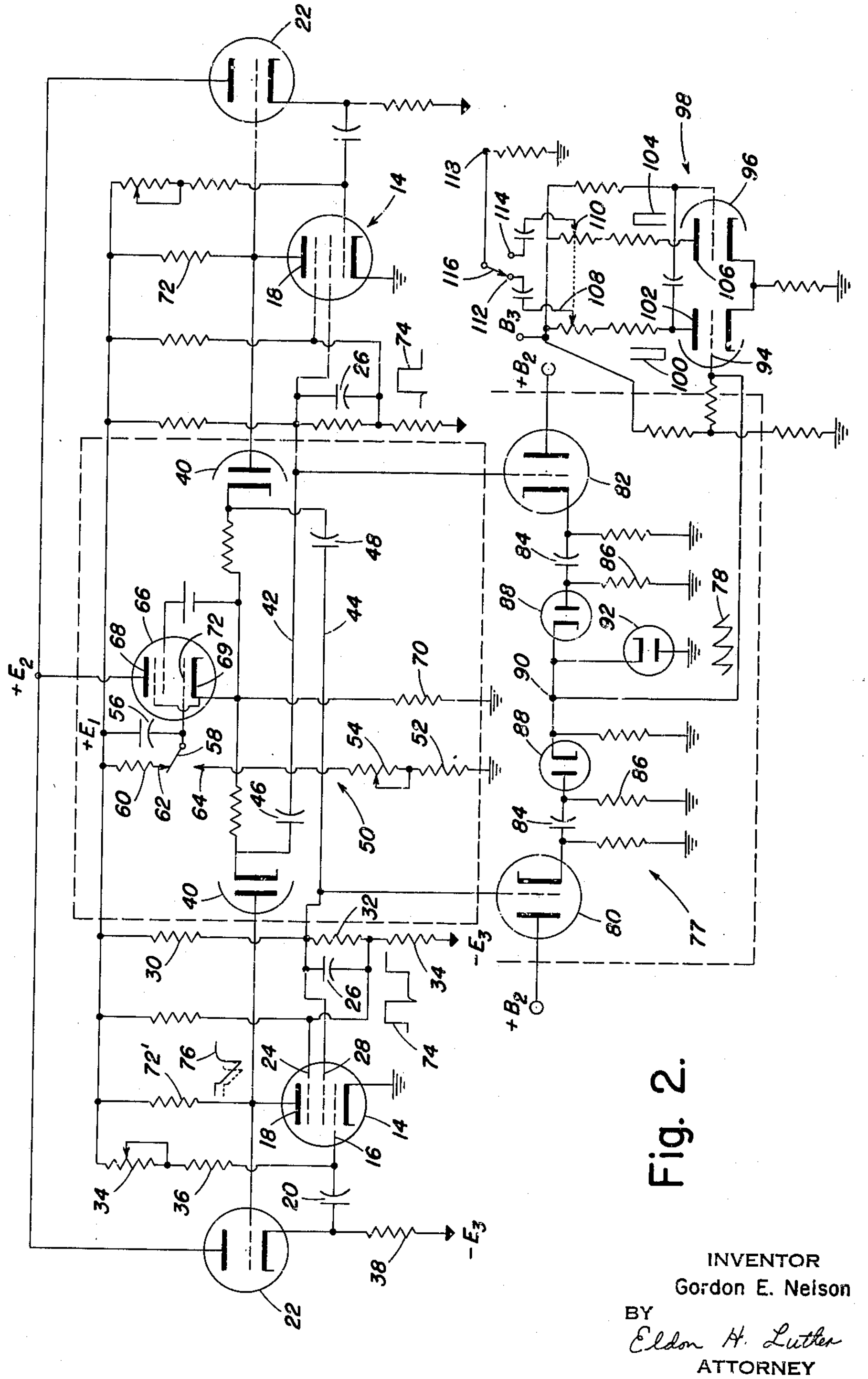
Fig. 2 is a circuit diagram of this improved embodiment with the circuits of the phantastron and univibrator and differentiator being illustrated.

In the operation of the phantastron circuits a positive square wave pulse 74 appears on the screen 28 at the same time the linear descending ramp appears on the plate of the phantastron with the ramp wave train being identified as 76 in Fig. 2. The pulses 74 for each of the two phantastron circuits are of course, 180° out of phase, as indicated in Fig. 2. This positive going pulse appearing on the screen of each of the phantastron circuits is fed to a mixer circuit 77 effective to produce a continuous wave train, with this train being identified in Fig. 2 as 78. Referring to this circuit 77, the rectangular pulses from the screens of the pair of phantastron circuits appear on the respective cathodes of the cathode followers 80 and are differentiated through the networks following tubes 80 and which includes capacitor 84 and resistor 86. The differentiated pulse appears across diodes 88 and will be a positive going pulse only. Any negative going pulse will not be passed through to point 90 because of reverse polarity at the diode except for the effect of diode interelectrode capacitance. Any such negative pulse that does pass the diodes is shunted to ground by diode 92. Positive pulses from diode 88 cannot be passed in the other diode in the reversed direction because of reversed polarity.

Accordingly a signal train 78 of repetitive positive going pulses is produced with this signal train being applied to grid 94 of the double triode 96 of the univibrator differentiator 98. This monostable multivibrator and differentiator is effective to simultaneously produce a negative pulse 100 on plate 102 and a positive pulse 104 on plate 106. Differentiated positive and negative pulses are taken off the plate circuits 102 and 106, respectively, by the variable contacts 108 and 110 of suitable potentiometers with negative pulse appearing at 114 and with these differentiated pulses being designated 115 and 117, respectively, in Fig. 1. Switch 116 is operative to engage contacts 112 and 114 so that at 118 a differentiated pulse appears, amplitude and polarity of which may be controlled as desired. The B+ supply for the univibrator is indicated as $B_3$.

Thus with the present invention an oscillation is produced that is logarithmically increasing during the run down of the voltage on capacitor 56. The logarithmic distribution of the frequency with time is extremely precise and the rate of sweep may be exactly controlled without affecting the accuracy of the logarithmical distribution with it being possible to stretch or compress the logarithmic distribution on the time axis over a wide range of frequency with the particular range that is covered being determined by the design and selection of components of the circuitry.

While the preferred and illustrative embodiment employs phantastron circuits cross coupled for sustained oscillation it is to be understood that other self-triggering circuit arrangements employing the Miller integrator or feed back operation for generating a linear ramp may be employed. As, for example, a self-triggering phantastron circuit or sanaphant or santratron circuit. All of these circuits employ the Miller integrator operation which is well known and is described on pages 195 to 197 of the aforementioned "Wave Forms" vol. 19.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What is claimed is:

1. An oscillator producing a logarithmically increasing frequency of precise accuracy and including a pair of phantastron circuits each of which has a plate catching diode the plate of which is connected with the plate of the phantastron tube and the cathode of which is connected to ground through a resistor whereby the starting voltage of tthe plate of each phantastron tube is regulated, said pair of circuits being cross-coupled for sustained oscillation, with this cross coupling being effected by capacitively coupling the cathode of the plate catching diode of each circuit with the suppressor of the phantastron tube of the other circuit, means operative to produce a logarithmically decaying voltage including a resistance-capacitance circuit, means operative to control the charging and discharging actions of the capacitor, said resistance being connected between the capacitor and ground so that a logarithmically decaying voltage is developed across the resistor on one of said actions with relation to the capacitor, a cathode follower the cathode of which is coupled to the cathodes of the plate catching diodes and is connected to ground through a suitable resistor and the control grid of which varies with the voltage across said resistor of the resistance-capacitance circuit whereby the starting voltage of the plates of phantastron circuits decrease logarithmically producing a logarithmically increasing frequency of oscillation.

2. The organization of claim 1 including a differentiator and mixer receiving the positive going pulses from the screens of the phantastrons and operative to differentiate the same and to combine the alternate leading edges of the positive going pulses to form a pulse train and a monostable multivibrator receiving said pulse train.

References Cited in the file of this patent

UNITED STATES PATENTS

| | | |
|---|---|---|
| 2,522,239 | Shepard | Sept. 12, 1950 |
| 2,767,378 | Hass | Oct. 16, 1956 |
| 2,797,320 | Beaufoy | June 25, 1957 |
| 2,881,318 | Hughes et al. | Apr. 7, 1959 |
| 2,903,648 | Bonner et al. | Sept. 8, 1959 |

OTHER REFERENCES

Waveforms, by Chance et al., Radiation Lab. Series, vol. 19, printed by McGraw-Hill, 1949 ed., pages 197 to 204.

Wide-Band Data Transmitter, by Gray et al., in Electronics, September 1953, pages 168–170.